United States Patent [19]

Gordon et al.

[11] 4,396,690
[45] Aug. 2, 1983

[54] DEVICE FOR THE SIMULTANEOUS PRODUCTION OF ELECTRICITY AND THERMAL ENERGY FROM THE CONVERSION OF LIGHT RADIATION

[75] Inventors: Arnold Z. Gordon, Lyndhurst; Thomas J. Gilligan, Painesville, both of Ohio

[73] Assignee: Diamond Shamrock Corporation, Dallas, Tex.

[21] Appl. No.: 259,973

[22] Filed: May 4, 1981

[51] Int. Cl.³ .......................................... H01M 6/36
[52] U.S. Cl. .................................. 429/111; 126/417; 204/242
[58] Field of Search ............... 429/111; 204/290 R, 204/290 F, 242; 126/417

[56] References Cited

U.S. PATENT DOCUMENTS

| | | | |
|---|---|---|---|
| 3,426,212 | 2/1969 | Klaas | 250/226 |
| 3,484,606 | 12/1969 | Masi | 250/71 |
| 3,801,490 | 4/1974 | Welch | 204/290 F |
| 3,912,931 | 10/1975 | Gravisse et al. | 250/458 |
| 3,953,876 | 4/1976 | Sirth et al. | 357/60 |
| 4,011,149 | 3/1977 | Nozik | 204/129 |
| 4,042,758 | 8/1977 | Weinstein et al. | 429/111 |
| 4,056,405 | 11/1979 | Varadi | 136/246 |
| 4,081,289 | 3/1978 | Campbell | 138/246 |
| 4,110,123 | 8/1978 | Goetzberger et al. | 136/247 |
| 4,135,537 | 1/1979 | Blieden et al. | 136/247 |
| 4,144,147 | 3/1979 | Jarrett et al. | 204/129 |
| 4,172,740 | 10/1979 | Campbell | 136/206 |
| 4,186,033 | 1/1980 | Boling et al. | 136/247 |
| 4,199,377 | 4/1980 | Corwin et al. | 136/255 |
| 4,217,402 | 8/1980 | Rod et al. | 429/111 |

FOREIGN PATENT DOCUMENTS

| | | |
|---|---|---|
| 2554226 | 6/1977 | Fed. Rep. of Germany . |
| 2620115 | 11/1977 | Fed. Rep. of Germany . |
| 2628917 | 1/1978 | Fed. Rep. of Germany . |
| 2644737 | 4/1978 | Fed. Rep. of Germany . |
| 2312123 | 12/1977 | France . |
| 2410506 | 6/1979 | France . |

OTHER PUBLICATIONS

M. A. Butler et al., "Photoelectrolysis with $YFeO_3$ Electrodes", *J. Appl. Phys.*, vol. 48, pp. 3070-3072 (1977).
A. B. Ellis et al., "Semiconducting Potassium Tantalate Electrodes," *J. Phys. Chem.*, vol. 80, pp. 1325-1328 (1976).
P. Salvador, "The Influence of Niobium Doping on the Efficiency of n-$TiO_2$ Electrodes in Water Photoelectrolysis," *Solar Energy Mat'ls*, vol. 2, pp. 413-421 (1980).
C. Stalder et al., "Photoassisted Oxidation of Water At Beryllium-Doped Polycrystalline $TiO_2$ Electrodes", *J. Electrochem. Soc.*, vol. 126, pp. 2007-2011 (1979).
M. Tomkiewicz et al., "Photoelectrolysis of Water with Semiconductors," *Appl. Phys.*, vol. 18, p. 21 (1979).
*Applied Optics*, Weber and Lambe, vol. 15, pp. 2299-2300, (Oct. 1976).
*Applied Optics*, Levitt and Weber, vol. 16, 10, pp. 2684-2689 (Oct. 1977).
*Applied Physics*, Goetzberger, 14, pp. 123-139 (1977).
"Preparation and Czochralski Crystal Growth of the Iron Titanates, $FeTiO_3$, $Fe_2TiO_4$, and $Fe_2TiO_5$", Binely and Baughman, *Mat. Res. Bull.*, vol. 11, pp. 1539-1544 (1976).
"The Photoelectrolysis of Water Using Iron Titanate Electrodes", Ginley & Butler, *J. Appl. Phys.*, 48, pp. 2019 (1977).
"Photo-Oxidation of Water at Barium Titanate Electrodes", Kennedy & Frise, Jr., *J. Electrochem Soc.*, 123, 1683 (1976).

*Primary Examiner*—Aaron Weisstuch
*Attorney, Agent, or Firm*—Bruce E. Harang

[57] ABSTRACT

A device for the simultaneous conversion of light energy into electrical energy and thermal energy utilizing a liquid-junction semiconductor photocell (PEC) utilizing a novel photoactive true solid/solid solution semiconductor mixed metal oxide material electrode so as to adjust the band gap and/or optical response properties of the electrode to be more closely attuned to the major output portion of the solar spectrum as well as lowering the cost of production and being environmentally sound.

39 Claims, 4 Drawing Figures

DEVICE FOR THE SIMULTANEOUS PRODUCTION OF ELECTRICITY AND THERMAL ENERGY FROM THE CONVERSION OF LIGHT RADIATION

BACKGROUND OF THE INVENTION

This invention relates generally to liquid-junction semiconductor devices for use as photocells and particularly to such devices for use as solar cells wherein both electrical and thermal energy is produced from light energy.

Concern over the continued availability as well as the continually escalating cost of fossil fuel energy sources has sustained high interest in the development of alternative energy sources, including solar power, which can be used to generate electricity. The devices most often considered for conversion of solar power into electricity are semiconductive devices, commonly called solar cells, which collect light, and generate photocurrent, in approximate proportion to the area of the photosensitive junction. This photosensitive junction must, therefore, be large to generate a useful current. The cost of manufacturing such devices depends in part on the area of the photosensitive junction and is presently too high to permit commercial exploitation of solar cells for other than limited and specialized applications.

The usual semiconductive devices for directly converting electromagnetic energy to electricity are photovoltaic cells "photocells," and common examples of photocells are silicon or gallium semiconductors having P-N junctions. Commonly, an electrical lead is connected on either side of the semiconductor across the P-N junction. Semiconductor photovoltaic cells are very expensive; in consequence, it has often been the practice to gather and concentrate the sunlight reaching a given semiconductor photocell so that extremely large areas of semiconductor material need not be employed as would be necessary without such a gathering system. The common gathering systems in the past were optical systems wherein lens systems concentrated light and focused the same on a given photovoltaic cell.

However, such a lens system was and is relatively expensive and is not useful in diffused light or on a cloudy day. More recently, however, there has been conceived a different type of collector and concentrator for radiation to be impinged on in a semiconductor photocell. For instance, Weber and Lambe, in *Applied Optics*, Vol. 15, pgs. 2299–2300, October, 1976, disclose a system whereby a large area sheet of material, such as a rigid plastic or a glass doped with luminescent material is exposed to solar radiation. The luminescent material ideally has a strong absorption of the sun's rays, especially in the visible region where the solar spectrum peaks, and it emits electromagnetic radiation of a longer wavelength suitable for activating the semiconductor photocell. A large portion of the light emitted from the luminescent material is in effect trapped in the collector with essentially total internal reflection until the light reaches an area where a photocell, such as a silicon photocell, is optically coupled to a small area, for instance, an edge of the collector. In this way, the light from the sun is not only converted to more suitable wavelengths for activation of the photocell but is concentrated, since the light received by the large area of the collector escapes only in the small area where the photocell is optically connected to the collector.

Another article by Levitt and Weber, appearing in *Applied Optics*, Vol. 16, 10, pgs. 2684–2689, October, 1977, should be read with the article first mentioned. Other publications aiding in the understanding of luminescent solar collectors include Geotzberger, *Applied Physics*, 14, 123–139 (1977) and U.S. Pat. No. 4,110,123 issued August, 1978, claiming priority in part based on German Patent Application Nos. 2620115 published Nov. 10, 1977, filed May 6, 1976, and 2628917 published Jan. 12, 1978, filed June 24, 1976, and referred to in the former patent application. German Patent Application No. 2554226, published June 6, 1977, is of some peripheral interest.

Also, numerous patents deal with the conversion of solar energy to different wavelengths by means of luminescent or fluorescent layers and impinging emitted light on a photocell; examples are U.S. Pat. Nos. 3,426,212, 3,484,606 and 3,912,931. In U.S. Pat. No. 3,912,931, benzene and other aromatic hydrocarbons are said to be "fixed" in layers of a silicone resin superimposed on a photocell.

U.S. Pat. No. 4,186,033, issued Jan. 29, 1980, to Bolling et al, discloses a structure for a conversion of solar energy to electricity and heat using a luminescent solar collector and concentrators in conjunction with a photovoltaic cell. The device of the above-mentioned reference works in the same general way as the devices disclosed in the Goetzberger et al. U.S. Pat. No. 4,110,123 and German Application No. 2620115, in the Weber and Lambe paper, and in the Levitt and Weber paper, but in addition claims an improved structure.

U.S. Pat. No. 4,081,289 shows a scheme for cooling solar cells as they generate electricity but in a very different setting from the above-mentioned patents and articles.

U.S. Pat. No. 4,056,405 issued Nov. 1, 1977, to Varadi discloses a solar panel structure which accepts a plurality of individual solar cells and provides a method of cooling these solar cells. Varadi is concerned with providing a housing to protect solar cells from both the environment and from overheating. Varadi does recognize that the heat removed may be utilized and is not just a waste product.

U.S. Pat. No. 4,172,740 issued Oct. 30, 1979, to Campbell discloses a solar cell and light concentration system wherein a liquid contained in a sphere is used as a lens system for solar cells located substantially in the center of said sphere. A method of extracting heat from the fluid is also disclosed.

None of these references, however, teach the combination of thermal and electrical production utilizing a photoelectrochemical cell in conjunction with a thermal transfer medium. Additionally, none of these references disclose a system wherein materials are used which are not highly toxic to the environment, i.e., they all discuss the use of the commonly used photovoltaic cells containing elements such as gallium, arsenic, selenium, etc., or disclose a heat transfer system with only generalizations of solar cells without discription of any specific solar cells.

While photoelectrochemical cells (PEC) offer an alternative to photovoltaic cells, they too have had the problem of being expensive to produce. Considerable effort has been devoted to finding ways to reduce the cost of semiconductor solar cell devices. Must of this effort has been directed, as in U.S. Pat. No. 3,953,876 issued Apr. 27, 1976, to devices in which the semiconductor material is desposited as a polycrystalline thin film on an inexpensive substrate rather than grown by the costly single crystal techniques used in earlier solar cells. A different approach that has generated enthusiasm is the use of a liquid-junction semiconductor solar cell. The active part of these cells is a junction formed at a semiconductor-liquid interface. Because the junction forms spontaneously at the liquid-solid interface, the device promises to be less costly to manufacture because relatively costly epitaxy or diffusion procedures required for the single crystal or polycrystalline devices mentioned above are not needed to form the junction.

However, four obstacles must be surmounted before such photocells can be exploited commercially. First, liquid-junction semiconductors ofter are not photochemically stable because the photoexcitation produces excess minority charge carriers at the semiconductor surface which may react with the semiconducting material, causing corrosion of the semiconductor surface. This corrosion proceeds in a manner that degrades the desired characteristics of the semiconductor surface and is manifested by the decay of the photocurrent from the cell with operating time. An example of such a reaction with a CdS electrode, for example, is $CdS(s) + 2h^+ \rightarrow S^0(s) + Cd^{++}$ (solvated), leading to the formation of a sulfur layer at the junction interface. One approach to solving this problem involves the use of, for example, a polysulfide-sulfide redox couple type of solution. Since the corrosion reaction $CdS(s) + 2^+ \rightarrow Cd^{++}$ (solvated) + $S(s)$ proceeds at a higher electrode potential then the reaction $S^{--} \rightarrow S + 2e$, the sulfur-polysulfide couple consumes the holes responsible for the corrosion reaction before the potential for the corrosion reaction is reached. A second approach to resolving this problem is to use a material which has a corrosion reaction potential so high as to be in effect corrosion resistant. Such materials are, for example, certain transition metal oxide compounds. A specific example is titanium dioxide.

Secondary, the cost of single crystal semiconductor electrodes is too high for commercial success. Several approaches have been tried to reduce the cost of single crystal semiconductors, especially chalcogenide electrodes. One approach involves the electrolytic co-deposition of the electrode materials, e.g., cadmium and selenium, on an inert substrate. Another approach involves the anodization of a cadmium or bismuth substrate to form a chalcogenide semiconductor. These methods, however, do not produce materials which are cost competitive in the market place.

Thirdly, the band gap of the photoelectrodes must be closely attuned to the major energy portion of the solar spectrum, i.e., approximately 1.4 eV. This band gap is necessary not only to produce greater power per surface area, thereby increasing the output of a given cell, but also to decrease the area of the liquid-solid junction needed and thereby lower the cost of the installation per unit of energy produced.

Finally, the liquid-junction semiconductor photocell needs to be one which is environmentally sound. Thus, while material such as cadmium and selenium may produce potentially useful power outputs when used in solar cells, they are themselves highly toxic materials. Therefore, they are not only environmentally harmful in use but also difficult and expensive to manufacture due to the necessary environmental considerations needed in the manufacturing processes of these materials.

SUMMARY OF THE INVENTION

A device has been discovered for the simultaneous conversion of light energy into electrical energy and thermal energy utilizing a liquid-junction semiconductor photocell (PEC) produced using a true solid/solid solution electrode of at least two metal oxides so as to adjust the band gap and/or optical properties of the electrode to more closely attune it to the major output portion of the solar spectrum as well as lowering the cost of production and providing a solar cell which is environmentally sound without the need for elaborate and expensive production procedures.

The present invention is directed broadly to a photoelectrochemical cell for producing electricity, fuel, chemicals and/or chemical energy, and thermal energy simultaneously, using light radiation, comprising (I) a first electrode comprising: a bulk or film electrode comprising a photoactive true solid/solid solution semiconductor material having a band gap attuned to the specific region of the energy spectrum of the desired utilization and which in the case of a film electrode is disposed on a supporting electrically conductive substrate; (II) a second electrode comprising: a conductive or semiconductive layer which is transparent to that region of the energy spectrum of the desired utilization of the first electrode (I) and which is disposed on a supporting conductive substrate, wherein said substrate is transparent to said region of the energy spectrum of said desired utilization, further characterized in that said second electrode, if a semiconductor, is of opposite conductivity type in relation to said first electrode; (III) an electrolyte disposed between, and in intimate contact with, both components I and II; (IV) a thermal transfer medium in intimate contact with said substrate of component I; (V) a means for receiving the thermal energy produced; and (VI) a means for receiving the electrical energy produced; wherein component I is further characterized in that said semiconductor material thereof is a layer of photoactive true solid/solid solution semiconductor material derived from precursor substances selected from the group consisting of elemental metals, non-oxide metal compounds, and mixtures thereof; said mixed metal oxide material corresponding to the formula $A_r{}^{va}M_y{}^{vm}O_z{}^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va and vm are defined by the relationship $va(r) + vm(y) = 2z$ wherein r equals a value of from 0 to 2, inclusive, y is from 1 to 2, inclusive, z is from 1 to 7, inclusive, va equals the positive valence of A, vm equals the positive mean valence of M and the valence of oxygen is −2; and wherein all said metal components of said formula are selected from the group consising of boron, aluminum, tin, lead, the transition metals of families 1b through 7b, inclusive, and 8 of the periodic table of elements and the lanthanide series; wherein M in the above formula comprises: (a) 50 to 99.9 mole percent, based on the total metals mole fraction, of one or more component (a) metals; and (b) 0.1 to 50 mole percent, based on the total metals mole fraction, of one or more component (b) metals; with the proviso that said component (b) metals are different than said component (a) metals and with the further proviso that said component (a) metals, when in comparable oxide form, have a larger band gap than said component (b) metals, when said component (b) metals are in their comparable oxide form.

BRIEF DESCRIPTION OF THE DRAWINGS

An embodiment of a photocell of this invention is shown in FIG. 1.

DETAILED DESCRIPTION

Figure 1:
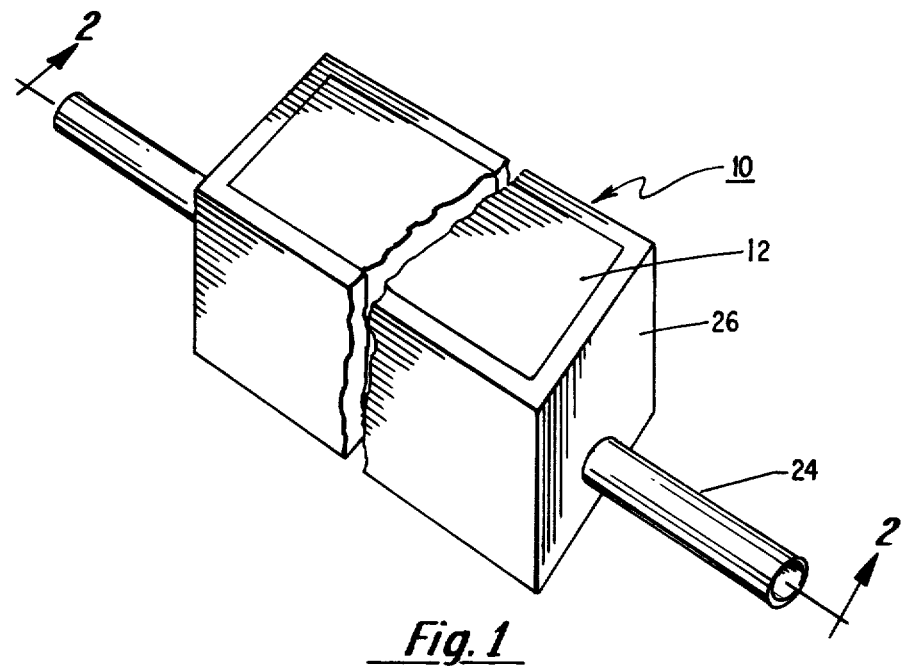

The cell configuration of FIG. 1 shown generally at 10 incorporates a containing means 26 (e.g., an encapsulant), a transparent conductive substrate 12 and a means for receiving the thermal energy produced indicated by input and output pipes identified as 24. A means for receiving the electricity produced is not shown but is understood to be present.

Figure 2:
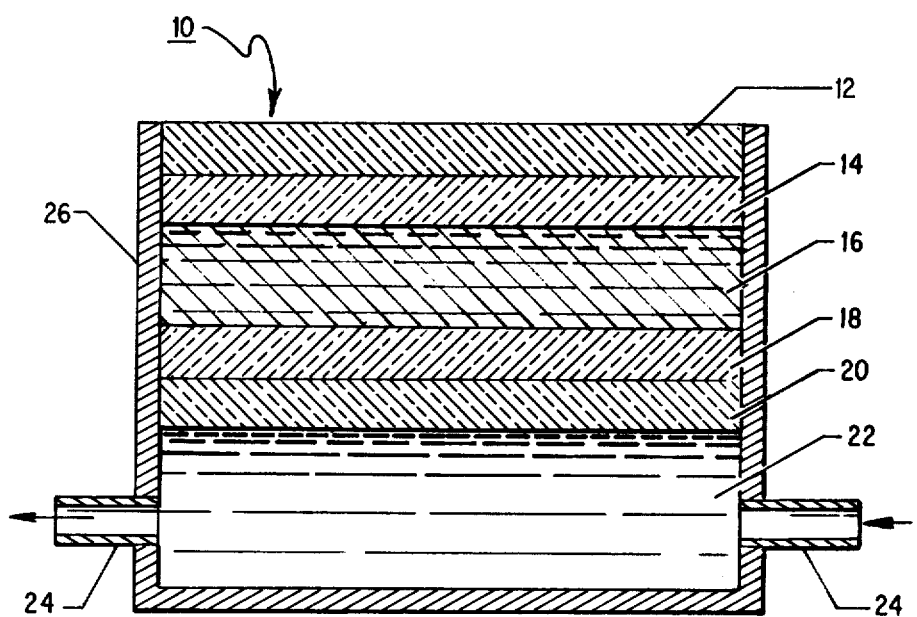
FIG. 2 is a schematic representation of a liquid-junction semiconductor photocell of FIG. 1 in cross-section along the line 2—2, wherein the electrolyte and the thermal transfer medium are different.

FIG. 2 is a cross-sectional schematic representaion of FIG. 1 as indicated by the section line 2—2, comprising the overall cell 10, a first electrode comprising a semiconducting layer 18 disposed on an electrically conducting substrate 20 and a second electrode comprising a transparent semiconductive layer 14 having a conductivity type opposite that of the first electrode disposed on an electrically conductive light transparent substrate 12 with a liquid electrolyte or solid electrolyte system 16 disposed between and in intimate contact with both the first and second electrodes, and a thermal energy transfer medium 22 in intimate contact with the electrically conductive substrate 20; a means, not shown, for moving said thermal energy transfer medium 22 by way of input and output pipes 24, and a containing means 26.

Light from a source (not shown) falling on the second electrode (12+14) passes through the second electrode and through the electrolyte (16) and is absorbed by the first electrode semiconductor layer 18. This causes a photoelectrochemical half-cell reaction to take place between the second electrode and the electrolyte and a photoelectrochemical half-cell reaction of the opposite type to take place between the first electrode and the electrolyte. The electricity produced by each half-cell reaction is removed via electrical contacts (not shown) to an electrical utilization system such as, for example, a battery (also not shown). There is, however, in cases where only electricity is produced by the half-cell reations, no net chemical change, as the results of the two half-cell reactions balance each other out. Simultaneously with the occurence of these half-cell reactions, thermal energy produced by the absorbtion of light by the semiconductor layer 18 is transmitted through the substrate 20 to the thermal transfer medium 22 and removed from the cell via pipes 24 to a thermal energy storage or utilization system not shown. It is understood that in the embodiments where fuel and/or chemicals, with or without electricity production, are produced, a net chemical change does occur. It is further understood that the description above is for those embodiments where both electrodes are semiconductors. Where the first electrode is a semiconductor and the second electrode is a counter electrode (i.e., not a semiconductor), the half-cell reaction of the first electrode and the electrolyte is balanced by a half cell reaction at the Schottky type barrier between the second electrode and the electrolyte.

Figure 3:
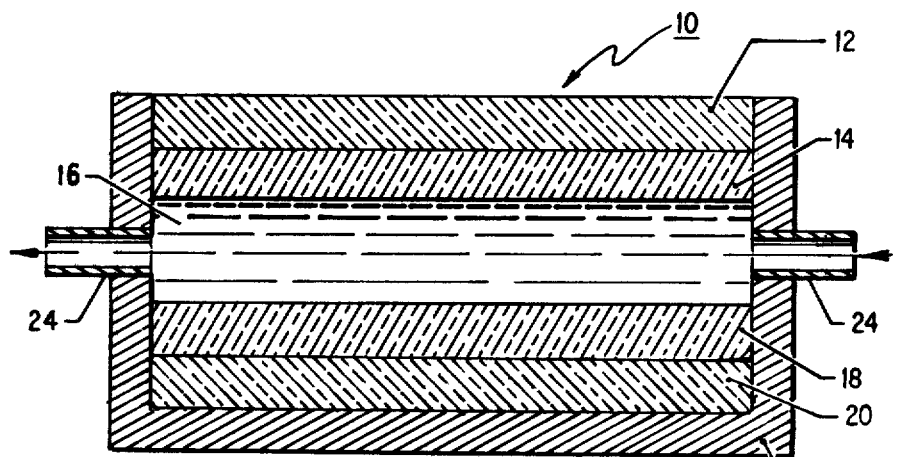
FIG. 3 is a schematic representation of a liquid-junction semiconductor photocell of FIG. 1 in cross-section along the line 2—2, wherein the electrolyte is also the thermal transfer medium.

FIG. 3 is a cross-sectional schematic representation of FIG. 1 as indicated by the section line 2—2, comprising the overall cell 10, a first electrode comprising a semiconducting layer 18 disposed on an electrically conducting substrate 20 and a second electrode comprising a transparent semiconductor layer 14 having a conductivity type opposite that of the first electrode disposed on an electrically conductive light transparent substate 12, with a liquid electrolyte 16 disposed between and in intimate contact with both first and second electrodes. This electrolyte 16 serves simultaneously as the thermal transfer medium. The operation of this cell is similar to that of the cell in FIG. 1 and, therefore, will not be further described.

Figure 4:
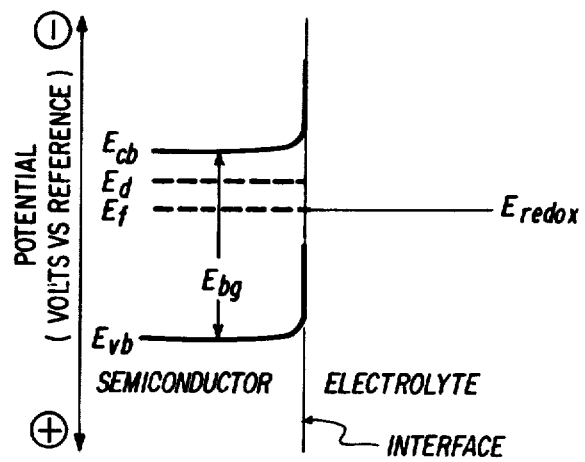
FIG. 4 is a schematic representation of the energy level relationship at the interface between a semiconductor electrode and an electrolyte.

FIG. 4 is described in greater detail below.

FIRST ELECTRODE

True solid/solid solution semiconductor film electrodes suitable for use as first electrodes provide improved spectral response and efficiency by combining at least two metal components all of which are derived from precursor substances selected from the group consisting of elemental metals, non-oxide metal compounds, and mixtures thereof. For convenience, two of the metal component precursors, and thus also the metals themselves (when referring to "M" as discussed hereinbelow), are herein grouped together as components (a) and (b). Component (a) precursors may be defined as non-oxide precursor substances, which in their oxide form, each have a band gap larger in size than any component (b) precursor, when subcomponent (b) precursor is in comparable oxide form. Stated another way, the one or more component (b) precursors may then be defined as non-oxide precursor substances each of which in its oxide form has a narrower band gap than any component (a) in comparable oxide form. Components (a) and (b) are combined to form a true solid/solid solution. Generally, component (a) and (b) precursors, being non-oxides, are elemental metals, non-oxide metal compounds or organometallic compounds as well as mixtures thereof, with the foregoing compounds containing, in addition to the metallic elements, other elements which are not exclusively oxygen. Suitable components (a) and (b) are those components containing metals selected from the group consisting of boron, aluminum, tin, lead, the lanthanide series and the transition metals. (As used throughout the specification and claims, the term "transition metal" means any metallic element of group 1b, 2b, 3b, 4b, 5b, 6b, 7b, or 8 of the periodic table of elements; and lanthanide series means any one of the elements numbers 58 through 71, inclusive, as they appear on pages 448 and 449 of the *Handbook of Chemistry and Physics,* Chemical Rubber Publishing Company, Cleveland, Ohio (1963)). More particularly, the metals of the components (a) and (b) precursors used to produce the true solid/solid solution photoactive semiconductor mixed metal oxide material of the instant invention are such that can result in the preparation of mixed metal oxide materials, the totality of which materials can be represented by the general formula $A_r{}^{va}M_y{}^{vm}O_z$. In the formula, M is a combination of component (a) metal and component (b) metal and A when present is at least one different metal which does not effectively and/or substantially alter the optical absorption in the electromagnetic region of interest accruing from M, and O represents oxygen; further characterized in that r, y, z, va and vm are defined by the relationship $(va)(r)+(v)(y)=2z$ wherein r is from 0–2, inclusive, y is from 1–2, inclusive, and z is from 1–7, inclusive, va equals the positive valence of A, vm equals the positive mean valence of M and the valence of oxygen is $-2$.

The A in the above general formula may be a single metal or A may be a combination of up to three different metals. In the formula, A may be any substantially, optically passive metallic ion (as defined below), such as zinc, strontium or lanthanide metals, wherein the lanthanide metals are any one of the elements Nos. 58 through 71, inclusive. The preferred metal or metals A are strontium, zinc, or one or more of the lanthanides.

In the above general formula, M is a combination of two to four different metals, preferably two different metals. The combination of metals is derived, as described above, so as to have at least one larger band gap and at least one narrower band gap metal compound. As an example, titanium and ruthenium are suitable, since $TiO_2$ has a larger band gap than $RuO_2$; so titanium is the component (a) metal while ruthenium serves as the component (b) metal.

It is understood that the above formula is used to represent the stoichiometry of the basic repeating unit lattice cell, so the values of r, y and z are often described in fractional notation such as, for Example, $SrTi_{0.67}Ru_{0.33}O_3$. This type of notation represents the stoichiometry of the basic repeating unit lattice cell. This type of notation also allows for the most simple illustrative cell structure to be used to describe the material in question. Further discussion of how this type of notation is used can be found in, for example, *Structure, Properties and Preparation of Perovskite-Type Compounds*, Fransis S. Galasso, Pergamon Press, 1969. However, it is also understood that the formula $Sr_3Ti_2RuO_9$ is an equivalent expression of exactly the same compound. Thus, applicant realizes that using the more classical whole number formula format would result in values above those specified by applicant in his instant invention while in fact describing suitable compounds. Examples of suitable values of r, y and z are examples of the resulting formulae are, for example, $r=0, y=1, z=2$ and the final oxide compound corresponds to the formula $MO_2$; $r=1, y=1, z=3$ and the final oxide compound corresponds to the formula $AMO_3$; $r=2, y=2, z=7$ and the final oxide compound corresponds to the formula $A_2M_2O_7$; $r=0, y=2, z=3$ and the final oxide compound corresponds to the formula $M_2O_3$; $r=0, y=1, z=1$ and the final oxide compound corresponds to the formula MO. Other compounds having other final oxide forms are also possible. Some specific examples are, for example, (Pd,Ca)O representing the form MO; (Ti,V)$O_2$ representing the form $MO_2$; (Fe,Al)$_2O_3$ representing the form $M_2O_3$; K(Ta,Nb)$O_3$ representing the form $AMO_3$ and La$_2$(Ti,Ru)$_2O_7$ representing the form $A_2M_2O_7$.

Representative component (a) precursors may be any elemental metal and/or other metal non-oxide compound which is soluble or can be made soluble, including aluminum, boron, tin, lead, certain lanthanides or the transition elements which form true solid/solid solutions of the form $MO_2$ such as zirconium and niobium. Component (a) precursors may also be an elemental metal and/or other metal non-oxide compound which is soluble or can be made soluble, including boron, aluminum, tin, lead, certain lanthanides or the transition metals which form true solid/solid solutions in the form $AMO_3$ such as, for example, titanium. Additionally, component (a) precursors may be an elemental metal and/or other metal non-oxide compound which is soluble or can be made soluble, including aluminum, boron, tin, lead, certain lanthanides or the transition metals producing a material having the general formula $A_r{}^{va}M_y{}^{vm}O_z{}^{-2}$ (as defined above) wherein M is a mixture of a transition metal or tin or lead plus one or more other metals, including boron, aluminum, tin, lead, certain lanthanides or transition metals. By the term "certain lanthanides" used herein to refer to component (a) metals is meant those lanthanides which have a band gap (as defined above) which is larger than any component (b). Component (a) comprises 50 to 99.9 percent based on the total metals mole fraction of M. Preferred component (a) precursors are non-oxide compounds of aluminum, niobium, lanthanum, tantalum, tin, titanium and zirconium, most preferably titanium. Some specific examples are titanium ethoxide, diethyl tin dibromide, zirconyl iodide and lanthanum chloride.

Component (b) metals may be any one or more of boron, aluminum, tin, lead and/or the transition metals in families 1b through 7b and group 8 and/or of the lanthanide series elements 58 through 71, inclusive, as set out in the periodic table of elements, with the restriction that all component (b) metals must be different than component (a) metals. Component (b) comprises 0.1 to 50 percent based on the total metals mole fraction of M. Preferred component (b) precursors are non-oxide metal compounds of iridium, manganese, chromium, iron, vanadium, platinum, rhodium and ruthenium, most preferably rhodium and ruthenium. Specific compounds suitable as component (b) precursors include, for example, ferrous sulfate, manganous acetate, ruthenium trichloride, rhodium nitrate and chloroplatinic acid.

Examples of preferred compounds from which M may be derived are, for example, a non-oxide compound from the group niobium, lanthanum, tantalum, tin, titanium and zirconium, one or more of which is used together with at least one non-oxide metal compound of the group comprising rhodium, ruthenium, iridium, manganese, chromium, iron, vanadium and platinum. Other combinations of non-oxide metal compounds selected from the group comprising boron, aluminum, tin, lead, the lanthanide series and the transition metals are also suitable. Presently preferred compounds from which M may be derived are those consisting of two non-oxide metal compounds, one selected from the group niobium, lanthanum, tantalum, tin, titanium and zirconium, and the other selected from the group rhodium and ruthenium. Specific examples of M are titanium-ruthenium, titanium-rhodium and zirconium-chromium.

The A in the above general formula may be any substantially optically passive metal (as defined below) such as, for example, zinc, strontium or one of the lanthanide series metals. It is to be understood that the materials used as A must meet the same requirements as precursors components (a) and (b) as far as composition and solubility. This is examplified, for example, in Example 1 and the illustrative embodiment. Photoactive semiconductor mixed metal oxide materials now produced may be used for both n-type and p-type photoactive semiconductor materials; alternatively, the p-type material when used in a n-p solar cell may be a material such as PdO, CoO, or one of the various $Ln_2O_3$ (lanthanide series oxide) phases and/or solid/solid solutions of said $Ln_2O_3$ materials.

By the term "soluble" as used herein when referring to component (a) and (b) precursors is meant that such are generally easily dissolved in the solvent systems, generally with only simple mixing and without deleterious side effects such as solids precipitation or phase separations. By the term "being made soluble," as such is used herein, is meant that the component (a) and (b) precursors can be dissolved in a solvent useful in the instant invention (and described in greater detail below), but such dissolution must be accomplished by special techniques to guard against deleterious phenomena such as phase separation or precipitation. It is also understood that any component A precursor, if used, must also be "soluble" or be capable of "being made soluble" as described above. Thus, for example, precursors as $SrCO_3$, as an A precursor, $RhCl_3$, as a component (b) precursor and $Ti(C_2H_5O)_4$, as a component (a) precursor are suitable. However, a compound such as $TiB_2$ is not suitable as it is not "soluble" in solvents or solvent systems as discussed hereinbelow, nor can it be "made soluble" by any known special technique.

Additionally, the photoactive semiconductor mixed metal oxide materials may be further altered as to their electrical and/or optical properties with dopants, procedures and treatments known and commonly used in the art. They include, for example, laser annealing, reduction and/or oxidizing atmosphere annealing and doping.

Applicant's general method of making the true solid/solid solution photoactive semiconductor mixed metal oxide material useful in the instant invention is as follows: (I) dissolving at least two different non-oxide metal ion precursors in liquid solvent; (II) separating said liquid solvent from said solution of step (I) by a separation means, leaving an intimately blended solid in non-oxide form; and (III) converting said intimately blended solid of step (II) to a true solid/solid solution mixed metal oxide by firing, thereby producing said photoactive semiconductor mixed metal oxide material. It is understood that in performing step (I) it may be necessary or advantageous to add additional solvent and/or add a quantity of different solvent after initial dissolution of one or more of the non-oxide metal ion precursors.

The first electrode may be a film electrode or may be a bulk electrode. In the case of a film electrode, a wide variety of substrates may be used. For example, the substrate may be a valve metal, a precious metal, other suitable metal, a ceramic, a glass or a composite of two or more of the above. It is understood that in the embodiment where the thermal transfer medium contacts the back of the first electrode, the first electrode's substrate must be serviceable as both an electrical conductor and a thermal conductor. In addition, the photoactive semiconductor electrode material can be sprayed either by flame or plasma spraying or dipped or painted onto said substrate. Additionally, coating methods such as, for example, vapor deposition may also be used. Generally, the film thickness used is from 100 angstroms to 200 microns in thickness. The thickness of the final film electrode may be acquired either as a single one-coat film or by coating the substrate with a number of coats to build up the desired thickness. The use of multiple coating operations allows for several important advantages to be incorporated into the film electrodes of the instant invention. One such advantage is that each layer may be treated individually with some type of post-deposition treatment. The post-deposition treatments possible with the instant invention include, for example, heating in a vacuum in a controlled atmosphere such as, for example, nitrogen, argon, hydrogen or oxygen or a combination thereof, submitting the electrode film to elevated temperature such as, for example, 200° to 1800° C., ion implantation of dopants and/or laser annealing. Pretreatment of the electrodes is also possible and in some cases preferred. The pretreatments possible include, for example, those listed above as suitable post-deposition treatment.

An example of a bulk first electrode would be a solid rod of photoactive true solid/solid solution semiconductor material immersed in an electrolyte.

SECOND ELECTRODE

The second electrode comprises both a transparent substrate and a transparent conductive or semiconductor layer. As herein before and hereafter used, transparent means transparent to that portion of the electromagnetic spectrum to which the band gap of the first semiconductive material has been attuned. Additionally, it is understood that these materials are transparent, as defined above, at the thickness used for the instant invention and not necessarily at all thicknesses. Thus, for instance, a gold film is transparent to most visible light when used in relatively thin layers but becomes opaque when relatively thick. Examples of suitable transparent substrates are, for example, glass, ruby, diamond, poly-(methylmethacrylate)-type polymers (PLEXIGLAS ®), fiberglass, polyurethane elastomer, silicones, silicates, metal films and combinations thereof.

It is understood that while materials such as, for example, PLEXIGLAS ® will work well as a transparent substrate, a combination of PLEXIGLAS ® coated with silicone (organosiloxane polymer) is even better because the silicone protects the PLEXIGLAS ® from adverse effects of weathering. It is also understood that known methods for coating PLEXIGLAS ® with silicone, for example, are contemplated in the instant invention. For instance, a silicone elastomer dissolved in a volatile solvent may be coated onto a sheet of PLEXIGLAS ® and the solvent allowed to dry, thereby leaving a thin layer of silicone elastomer on the surface of said PLEXIGLAS ®.

Suitable transparent semiconductive or conductive materials are, for example, ternary mixed metal oxides such as $La_{0.01}Sr_{0.99}SnO_3$, vapor deposited gold metal film and chalcogenides. Materials such as metal mesh may also be used within the scope of the invention as a transparent second electrode. An example of such a mesh material is a gold-plated copper mesh of fine "hair-like" filaments.

It is also understood that in some cell configurations known in the art, carbon or graphite may be used as the second electrode. It is understood that the second electrode must be of the opposite conductivity type of the first electrode in the embodiment where both electrodes are semiconductors. Therefore both electrodes cannot be identical.

Suitable transparent second electrodes are, for example, $La_{0.01}Sr_{0.99}SnO_3$ disposed as a film on PLEXIGLAS ® and $Cd_2SnO_4$ disposed as a film on nylon or on a polyester (Mylar ®).

The transparent second electrode may be applied to the transparent substrate by various methods known in the electrode art. Examples of these methods are, for example, pressing, bonding, vapor deposition, fusing, electrolysis deposition and chemical vapor deposition.

ELECTROLYTE

The electrolytes used in the instant invention may be any commonly known to the art such as, for example, liquids, gels and sols. These materials must be transparent in the form and thicknesses used for a particular embodiment.

Examples of solvents for use in liquid electrolytes are, for example, water, ammonia, aqueous redox couple solutions and halogenated hydrocarbons such as FREON R-12, FREON R-22 and FREON R-11.

Examples of suitable redox-couples are, for example, $AsO_2^{-1}+4OH^{-1}=AsO_4^{-3}+2H_2O+2e(1\ m\ NaOH)$; $3Br^{-1}=Br_3^{-1}+2e$; $C_6H_4(OH)_2=C_6H_4O_2+2H^{+1}+2e$; $Cb^{+3}+H_2O=CbO^{+3}+2H^{+1}+2e(6\ m\ HCl)$; $Ce^{+3}+H_2O=CeOH^{+3}+H^{+1}+e$; $2Cl^{-1}=Cl_2(g)+2e$; $Co^{+2}+Co^{+3}+e(3\ m\ HNO_3)$; $Co(CN)_6^{-4}=Co(CN)_6^{-3}+e$; $Cr^{+2}=Cr^{+3}+e$; $2Cr^{+3}=Cr_2O_7^{-2}+3e(2\ m\ H_2SO_4)$; $Cr^{+3}=CrO_4^{-2}+3e(1\ m\ NaOH)$; $Cu^{+1}=Cu^{+2}+e$; $Fe^{+2}=Fe^{+3}+e$; $Fe(C_{12}H_8N_2)_3^{+2}=Fe(phenanthroline)_3^{+3}+e$; $Fe(CN)_6^{-4}=Fe(CN)_6^{-3}+e(1\ m\ H_2SO_4)$; $Fe(CN)_6^{-4}=Fe(CN)_6^{-3}+e(0.01\ m\ NaOH)$; $H_2=2H^{+1}+2e$; $H_2+2OH^{-1}=2H_2O+2e$; $Hg_2^{+2}=2Hg^{+2}+2e$; $2H_2O=O_2+4H^{-1}+4H^{+1}+4e$; $H_2O=O(g)+2H^{+1}+2e$; $3I^{-1}=I_3^{-1}+2e$; $Ni(CN)_3^{-2}+CN^{-1}=Ni(CN)_4^{-2}+e$; $4OH^{-1}=O_2+2H_2O+4e$; $H_2PO_2^{-1}+3OH^{-1}=HPO_3^{-2}+2H_2O+2e$; $H_3PO_2+H_2O=H_3PO_3+2H^{+1}+2e$; $Pb^{+2}+2H_2O=PbO_2+4H^{+1}+2e$; $PdCl_4^{-2}+2Cl^{-1}=PdCl_6^{-2}+2e$; $Rh^{+3}+H_2O=RhO^{+2}+2H^{+1}+e$; $Ru(III)=Ru(IV)+e(HCl)$; $S^{-2}+6OH^{-1}=SO_3^{-2}+3H_2O+6e$; $SO_3^{-2}+2OH^{-1}=SO_4^{-2}+H_2O+2e$; $Sn(II)=Sn(IV)+2e(0.1\ m\ HCl)$; $Sn(II)=Sn(IV)+2e(2\ m\ HCl)$; $Tl^{+1}=Tl^{+3}+2e$; $V^{+2}=V^{+3}+e$; $V^{+3}+H_2O=VO^{+2}+2H^{+1}+1e$; $VO^{+2}+3H_2O=V(OH)_4^{+1}+2H^{+1}+e$; $V(IV)=V(V)+e(1\ m\ HCl)$; $V(IV)=V(V)+e(1\ m\ NaOH)$; $W(CN)_8^{-4}=W(CN)_8^{-3}+e$; and $Yb^{+2}=Yb^{+3}+e$. It is understood that the above reactions take place at one electrode and that an opposite reaction must take place at the other electrode. A presently preferred redox couple is an aqueous solution of NaOH.

Examples of suitable gel electrolytes are, for example, aqueous solutions of NaOH and KNOX ® gelatin.

In one preferred embodiment, the electrolyte is a solid electrolyte system comprising a combination of a ionomer or polymer solvated with a liquid electrolyte material.

Examples of suitable materials are, for example, the lithium sulfonate form of NAFION ® and polyhydroxyethylmethylacrylate (HEMA). Presently, the preferred method of utilizing these materials is by casting them directly onto the first electrode and then solvating them with a liquid electrolyte. It is understood, however, that other techniques for using these solid-type electrolytes in the instant invention known in the art may also be used.

THERMAL TRANSFER MEDIUM

The thermal transfer medium may be the same material as the electrolyte as described above. The thermal transfer medium may also be a different material than the electrolyte. Further, as discussed above, the electrolyte may act simultaneously as the thermal transfer medium. Finally, the thermal transfer medium may be separate from the material used as the electrolyte. This thermal transfer medium can be a liquid, a gas, a gel or a sol. Examples of suitable gases include, for example, ammonia, halogenated hydrocarbons and air. Air, being the least expensive, is preferred in many applications. Examples of suitable liquids include, for example, water, ammonia, and halogenated hydrocarbons. It is also contemplated that mixtures of gases and liquids to form "fogs" or "mists" are also suitable such as, for example, an air/water mist or fog.

CONTAINING MEANS

A containing means is provided for containing the electrolyte in proper intimate contact with the electrodes. Suitable examples of materials useful as the containing means for the electrolyte are, for example, glass, ceramic, suitable metal, suitably coated metal, tetrafluoroethylene (TFE), fluorinated ethylene-propylene resin (FEP), polyvinylidene difluoride (PVDF), glass fiber filled resin (FIBERGLAS ®), polyvinyl chloride (PVC), post-chlorinated polyvinyl chloride (CPVC), plastic, polyesters and combination thereof. Examples of suitable metals include stainless steel, aluminum, and titanium. Examples of suitable coated metals include, for example, steel coated with PVC, aluminum coated with polyurethane elastomer and steel lined with FIBERGLAS ®. As herein described, plastic means materials such as thermoplastic, polyurethanes, resins, elastomers, nylons and nylon-type materials.

RECEIVING MEANS

The electricity produced may be collected and/or used by methods known in the art. For example, the electricity produced may be used directly in an electrical circuit. Alternatively, the electricity may be stored, for example, in a chemical storage battery. These PEC's of the instant invention may also be used to produce chemicals, fuels and/or chemical energy by methods known and practiced in the art.

The energy level relationships at the interface between a semiconductor electrode and the electrolyte solution are shown schematically in FIG. 4. Energy levels of the electrodes shown there, measured against a reference are $E_f$, the Fermi level, and $E_{cb}$ and $E_{vb}$, the lowest lying energy level of the conduction band and the highest lying level of the valence band of the semiconductor, respectively. The energy band gap of the semiconductor is represented by $E_{bg}$.

Absorption of light by the semiconductor of an energy corresponding to $E_{bg}$ promotes an electron from the valence band to the conduction band and the subsequent separation of electron/electron hole pairs. In n-type titanium dioxide, the energy band gap is normally about 3 eV, corresponding to a light absorption edge of about 400 nanometers wavelength. In the photoactive true solid/solid solution semiconductor electrodes of the present invention, this absorption edge can be shifted as desired anywhere from the infrared region through the visible light region and into the ultraviolet region, thus making these electrodes responsive to any area of the electromagnetic spectrum desired for a particular utilization. Currently, of course, the most important adaptation is one in which the band gap is modified to be approximately 1.4 eV, corresponding to a light absorption edge of about 800 nanometers, respecting the area of greatest energy output of the solar spectrum.

In an n-type photoactive material, for example, photogenerated electrons promoted to the conduction band migrate through the semiconductor, while the corresponding electron holes tend to migrate to the electrode/electrolyte interface. If the reduction-oxidation potential, $E_{redox}$, of the electrolyte solution or of some solid species is more negative than $E_{vb}$, interfacial electron transfer can occur to fill the electron holes, simultaneously oxidizing the solvent or solute species. Oxidation of the semiconductor material itself may also occur if the potential for anodic dissolution, $E_d$, of the material is more negative than $E_{vb}$. Whether oxidation of some electrolytic species or the semiconductor material itself is the predominating reaction at the illuminated electrode depends upon the relative surface rates of the two reactions.

If $E_d$ is more negative than $E_{redox}$, then the oxidized form of the electrolyte species once formed by the photoassisted oxidation reaction is capable of oxidizing the semiconductor material and the electrode surface may be corroded. The choice of modifying oxide (component b) may be thus governed in part by the relative values of $E_d$ for the material and $E_{redox}$ for the oxidation reaction in which the modified type true solid/solid solution electrode is to be employed.

For purposes of clarity, several embodiments will be used to illustrate the method of making said true solid/solid solution semiconductor mixed metal oxide material useful in the instant invention. However, these embodiments are in no way limiting nor are they the only possible methods of producing said true solid/solid photoactive semiconductor mixed metal oxide material. These particular embodiments are as follows:

I

Photoactive semiconductor materials of the formula $SrTi_{1-x}Rh_xO_3$ were prepared as follows:

Strontium/Titanium Stock Solution 147.6 g (1 mole) of $SrCO_3$ (reagent grade) was dissolved in approximately 600 mls of a solvent solution having a ratio (vol/vol) of 1 part concentrated aqueous HBr to 4 parts deionized water. When dissolution of the $SrCO_3$ was complete, 227.9 g (1 mole) of $Ti(C_2H_5O)_4$ (reagent guide) was added and mixed until complete dissolution, enough additional solvent solution was added to make 1 liter. A clear, yellow solution which keeps for 6 to 7 days at room temperature resulted. It is important to dissolve the $SrCO_3$ in most of the solvent solution first to help keep the $Ti(C_2H_5O)_4$ from precipitating the Ti out as $TiO_2$ immediately.

Stronium/Rhodium Stock Solution 1.84 g (0.0125 mole) of $SrCO_3$ (puratronic grade) and 3.29 g (0.0125 mole) of $RhCl_3.3H_2O$ (reagent grade) was dissolved and diluted to 1 liter volume in a solvent solution having a ratio (vol/vol) of 1 part concentrated aqueous HBr, 1 part isopropyl alcohol and 6 parts deionized water. The resulting solution was stored in a freezer at $-10°$ C. This solution seems to store indefinitely at this temperature. Inductively coupled plasma confirmed a Sr to Rh ratio of 1:1.

Five true solid/solid solution photoactive materials with differing amounts of Ti and Rh as shown in Table 1 were prepared by (a) intimately mixing the appropriate amounts of the Strontium-Rhodium and Strontium-Titanium solutions and (b) precipitating the metals by adding a solution containing 150 g of $NH_4HCO_3$, 80 ml of aqueous concentrated $NH_3$ and 100 ml of deionized water. The resulting precipitate containing solution was centrifuged in an International Equipment Co. Model EXD centrifuge at a setting of 50 and the resulting supernatant removed by decanting. The precipitates were placed in alumina crucible with lids and were annealed in a Blue "M" box-type muffle furnace to approximately 600° to 800° C. at a rate of about 100° C./hour in an air atmosphere. The resulting solid/solid solution mixed metal oxides were allowed to cool and were stored in polyethylene bottles.

TABLE 1

| Sample No. | Stock Solution Sr—Ti (ml) | Stock Solution Sr—Rh (ml) | x(%)* |
|---|---|---|---|
| 1a | 60 | 240 | 4.8 |
| 1b | 200 | 180 | 1.1 |
| 1c | 200 | 120 | 0.74 |
| 1d | 200 | 90 | 0.56 |
| 1e | 200 | 45 | 0.28 |

*The value of x is a nominal value which, due to a number of possible loss mechanisms (i.e., metal staying in solution, precipitate too fine to bring down during centrifuging, vaporization, etc.), may be altered as to the actual final metal mole ratio.

Thus, an illustrative embodiment of a liquid-junction semiconductor photoelectrochemical cell (PEC) of the present invention may be assembled by first inserting a film electrode made of a titanium metal substrate and a semiconductor mixed metal oxide layer of $SrTi_{0.95}Pt_{0.05}O_3$ on the floor of a containing means made from fluorinated ethylene-propylene resin (FEP). An electrolyte made of 1 M KOH aqueous solution saturated with air is then placed in the containing means. A second electrode made up of $La_{0.01}Sr_{0.99}SnO_3$ disposed on a glass substrate is placed over and in contact with the electrolyte and seals the containing means. A means for moving the electrolyte through the PEC and through a thermal exchanger is provided for the containing means. When this embodiment of the PEC is outfitted with suitable electrical contacts and measuring equipment and exposed to sunlight, it will be found to generate an electrical current utilizing electromagnetic energy from the visible light region of the solar spectrum.

While there has been shown and described what is believed at present to constitute the preferred embodiments of the present invention, it will be obvious to those skilled in the art that various changes and modifications may be made therein without departing from the scope of the invention as defined by the appended claims.

What is claimed is:

1. A liquid-junction photoelectrochemical semiconductor cell adapted for producing electricity, fuel, chemicals and/or chemical energy and simultaneously producing thermal energy, using light radiation, comprising the following components:
   I. a first electrode comprising: a bulk or film electrode comprising a photoactive true solid/solid solution mixed metal oxide semiconductor material having a band gap of about 1.4 eV and which in the case of a film electrode is disposed on a supporting electrically conductive substrate;

II. a second electrode comprising: a conductive or semiconductive layer which is transparent to that region of the energy spectrum utilized by component (I) and which is disposed on a supporting conductive substrate, wherein said substrate is transparent to said region of the energy spectrum, further characterized in that said second electrode, if semiconducting, is of opposite conductivity type in relation to said first electrode;

III. an electrolyte disposed between, and in intimate contact with, both components I and II;

IV. a thermal transfer medium in thermal contact with component I.;

V. means for receiving the thermal energy produced;

VI. means for receiving the electrical energy produced;

wherein component I is further characterized in that said semiconductor material thereof is a photoactive true solid/solid solution semiconductor material derived from precursor substances selected from the group consisting of elemental metals, non-oxide metal compounds, and mixtures thereof; said mixed metal oxide material corresponding to the formula $A_rv^aM_y^{v-m}O_z^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va, and vm are defined by the relationship $va(r)+vm(y)=2z$, wherein r equals a value of from 0 to 2, inclusive, y is from 1 to 2 inclusive, z is from 1 to 7 inclusive, va equals the positive valence of A, vm equals the positive mean valence of M and the valence of oxygen is $-2$; and wherein all said metal components of said formula are selected from the group consisting of boron, aluminum, tin, lead, the transition metals of families 1b through 7b, inclusive and 8 of the periodic table of elements, and lanthanide series; wherein M in the formula comprises:

(a) 50 to 99.9 mole percent, based on the total metals mole fraction, of one or more component (a) metals; and (b) 0.1 to 50 mole percent, based on the total metals mole fraction, of one or more component (b) metals;

with the proviso that said component (b) metals are different that said component (a) metals, and with the further proviso that said component (a) metals, when in comparable oxide form, have a larger band gap than said component (b) metals, when said component (b) metals are in their comparable oxide form.

2. A photoelectrochemical cell as claimed in claim 1 wherein said electrolyte is maintained in intimate contact with said electrodes by immersion of said electrodes in said electrolyte.

3. A photoelectrochemical cell as claimed in claim 1 wherein said component III is selected from the group consisting of solvated ionomers and solvated polymers, solvated with a liquid material capable of redox chemistry.

4. A photoelectrochemical cell as claimed in claim 1 wherein said thermal transfer medium is a liquid or a gas.

5. A photoelectrochemical cell as claimed in claim 4 wherein said liquid is selected from the group consisting of water, ammonia and halogenated hydrocarbons.

6. A photoelectrochemical cell as claimed in claim 1 wherein said thermal transfer medium is air.

7. A liquid-junction photoelectrochemical semiconductor cell adapted for producing electricity, fuel, chemicals and/or chemical energy and simultaneously producing thermal energy, using light radiation, comprising the following components:

I. a first electrode comprising: a bulk or film electrode comprising a photoactive true solid/solid solution mixed metal oxide semiconductor material having a band gap of about 1.4 eV and which in the case of a film electrode is disposed on a supporting electrically conductive substrate;

II. a second electrode comprising: a conductive or semiconductive layer which is transparent to that region of the energy spectrum utilized by component (I) and which is disposed on a supporting conductive substrate, wherein said substrate is transparent to said region of the energy spectrum of said desired utilization, further characterized in that said second electrode, if semiconducting, is of opposite conductivity type in relation to said first electrode:

III. an electrolyte disposed between, and in intimate contact with, both components I and II, further characterized in that said electrolyte is also a thermal transfer medium;

IV. means for receiving the thermal energy produced;

V. means for receiving the electrical energy produced;

wherein component I is further characterized in that said semiconductor material thereof is a photoactive true solid/solid solution semiconductor material derived from precursor substances selected from the group consisting of elemental metals, non-oxide metal compounds, and mixtures thereof; said mixed metal oxide material corresponding to the formula $A_rv^aM_y^{v-m}O_z^{-2}$; where said formula represents the stoichiometry of the basic repeating unit lattice cell; where M is the combination of component (a) metal and component (b) metal; A when present is at least one different metal which does not substantially alter the optical absorption accruing from M in the above formula; O represents oxygen, said formula being further characterized in that r, y, z, va and vm are defined by the relationship $va(r)+vm(y)=2z$, wherein r equals a value of from 0 to 2, inclusive, y is from 1 to 2, inclusive, z is from 1 to 7, inclusive, va equals the positive valence of A, vm equals the positive mean valence of M and the valence of oxygen is $-2$; and wherein all said metal components of said formula are selected from the group consisting of boron, aluminum, tin, lead, the transition metals of families 1b through 7b, inclusive, and 8 of the periodic table of elements, and the lanthanide series; wherein M in the above formula comprises:

(a) 50 to 99.9 mole percent, based on the total metals mole fraction, of one or more component (a) metals; and (b) 0.1 to 50 mole percent, based on the total metals mole fraction, of one or more component (b) metals;

with the proviso that said component (b) metals are different than said component (a) metals, and with the further proviso that said component (a) metals, when in comparable oxide form have a larger bandgap than said component (b) metals, when said component (b) metals are in their comparable oxide form.

8. A photoelectrochemical cell as claimed in claim 7 wherein said electrolyte is a liquid.

9. A photoelectrochemical cell as claimed in claim 7 wherein said electrolyte is a sol.

10. A photoelectrochemical cell as claimed in claims 1 or 2 or 7 wherein said electrolyte is selected from the group consisting of a liquid, a sol and a gel.

11. A photoelectrochemical cell as claimed in claims 1 or 7 wherein said electrolyte is an aqueous redox couple.

12. A photoelectrochemical cell as claimed in claims 1 or 7 wherein a containing means is provided to contain said electrolyte.

13. A photoelectrochemical cell as claimed in claim 12 wherein said containing means is selected from the group consisting of glass, ceramic, suitable metals, suitable coated metals, plastic and combinations thereof.

14. A photoelectrochemical cell as claimed in claim 12 wherein said containing means is glass.

15. A photoelectrochemical cell as claimed in claim 12 wherein said containing means is selected from the group consisting of tetrafluoroethylene (TFE), fluorinated ethylene-propylene resin (FEP), polyvinylidene difluoride (PVDF), a polyvinyl chloride (PVC), a post-chlorinated polyvinyl chloride (CPVC) and composites thereof.

16. A photoelectrochemical cell as claimed in claim 12 wherein said containing means is a glass fiber filled resin material.

17. A photoelectrochemical cell as claimed in claims 1 or 7 wherein said means for utilizing said electrical energy is an electrical circuit.

18. A photoelectrochemical cell as claimed in claims 1 or 7 wherein said means for utilizing said electrical energy is a storage means.

19. A photoelectrochemical cell as claimed in claim 18 wherein said storage means is a battery.

20. A photoelectrochemical cell as claimed in claims 1 or 7 wherein said means for receiving the thermal energy is a thermal transfer system.

21. A photoelectrochemical cell as claimed in claims 1 or 7 wherein said means for receiving the thermal energy is a thermal storage means.

22. A photoelectrochemical cell as claimed in claims 1 or 7 wherein for said formula, x is 0, y is 1, z is 2 and the final oxide corresponds to the formula $MO_2$.

23. A photoelectrochemical cell as claimed in claims 1 or 7 wherein for said formula, x is 1, y is 1, z is 3 and the final oxide compound corresponds to the formula $AMO_3$.

24. A photoelectrochemical cell as claimed in claims 1 or 7 wherein for said formula, x is 2, y is 2, z is 7 and the final oxide compound corresponds to the formula $A_2M_2O_7$.

25. A photoelectrochemical cell as claimed in claims 1 or 7 wherein for said formula, x is 0, y is 2, z is 3 and the final oxide compound corresponds to the formula $M_2O_3$.

26. A photoelectrochemical cell as claimed in claims 1 or 7 wherein for said formula, x is 0, y is 1, z is 1 and the final oxide compound corresponds to the formula MO.

27. A photoelectrochemical cell as claimed in claims 1 or 7 wherein for said formula A is a single metal selected from the group consisting of strontium, zinc and the lanthanides.

28. A photoelectrochemical cell as claimed in claims 1 or 7 wherein for said formula A is a combination of from 2 to 3 different metals selected from the group consisting of strontium, zinc and the lanthanides.

29. A photoelectrochemical cell as claimed in claims 1 or 7 wherein for said formula M is a combination of two different metals selected from the group consisting of boron, aluminum, tin, lead, the lanthanide series and the transition metals.

30. A photoelectrochemical cell as claimed in claims 1 or 7 wherein for said formula M is a combination of titanium and a metal selected from the group consisting of Rh, Ru, Ir, Mn, Cr, Fe, V and Pt.

31. A photoelectrochemical cell as claimed in claims 1 or 7 wherein for said formula M is a combination of aluminum and a metal selected from the group consisting of Rh, Ru, Ir, Mn, Cr, Fe, V and Pt.

32. A photoelectrochemical cell as claimed in claims 1 or 7 wherein for said formula M is a combination of Ru or Rh and one metal selected from the group consisting of niobium, lanthanum, tantalum, tin, titanium and zirconium.

33. A photoelectrochemical cell as claimed in claims 1 or 7 wherein for said formula M is a combination of 3 to 4 different metals characterized in that one metal is selected from the group Al, Nb, La, Ta, Sn, Ti and Zr and the remaining different metals are selected from the group consisting of Ir, Mn, Cr, Fe, V, Pt, Rh and Ru.

34. A photoelectrochemical cell as claimed in claims 1 or 7 wherein said substrate of component II is selected from the group consisting of glass, tetrafluoroethylene (TFE), fluorinated ethylene-propylene resin (FEP), polyvinylidene difluoride (PVDF), a polyvinyl chloride (PVC), a post-chlorinated polyvinyl chloride (CPVC), poly-(methylmethacrylate)-type polymers, silicone, silicates, suitable transparent inorganic materials, suitable transparent organic materials or combinations thereof.

35. A photoelectrochemical cell as claimed in claims 1 or 7 wherein said substrate of component I is selected from the group consisting of a valve metal, a precious metal, other metal, ceramic, glass and combinations thereof.

36. A photoelectrochemical cell as claimed in claims 1 or 7 wherein said substrate of component I is selected from the group consisting of titanium, zirconium and tin.

37. A photoelectrochemical cell as claimed in claims 1 or 7 wherein said electrolyte is contains the redox couple $4e^- + O_2(g) + 2H_2O = 4OH^-(aq)$.

38. A photoelectrochemical cell as claimed in claims 1 or 7 wherein said first electrode is produced using a single layer of said true solid/solid solution metal oxide material.

39. A photoelectrochemical cell as claimed in claims 1 or 7 wherein said first electrode is produced using at least two layers of said true solid/solid solution metal oxide material.

* * * * *